United States Patent [19]

Schumacher et al.

[11] Patent Number: 4,999,902

[45] Date of Patent: Mar. 19, 1991

[54] PROCESS FOR ALIGNING A RECIPROCABLE FRAME BETWEEN PARALLEL VERTICALLY EXTENDING SHIFTS OF A MAST OF A FORK LIFT

[75] Inventors: Kenneth E. Schumacher, Pleasantville; Thomas K. Thompson, Granville, both of Ohio

[73] Assignee: Teledyne Princeton, Inc., Rexsdale, Canada

[21] Appl. No.: 487,151

[22] Filed: Mar. 2, 1990

Related U.S. Application Data

[62] Division of Ser. No. 312,058, Feb. 21, 1989, Pat. No. 4,921,075.

[51] Int. Cl.[5] .......... B23Q 3/00

[52] U.S. Cl. .......... 29/464; 187/95

[58] Field of Search .......... 29/464; 187/95; 384/626

[56] References Cited

U.S. PATENT DOCUMENTS

| | | | |
|---|---|---|---|
| 2,059,150 | 7/1933 | Schroeder | 414/632 |
| 2,667,985 | 2/1954 | Woughter | 414/631 |
| 3,035,663 | 5/1962 | Mehlmann | 187/95 |
| 3,039,637 | 6/1962 | Akrep | 414/632 |
| 3,235,105 | 2/1966 | Loomis | 414/544 |
| 3,252,545 | 0/1966 | Quayle | 187/9 R |
| 3,321,109 | 5/1967 | Beebe | 222/637 |
| 3,586,183 | 6/1971 | Shaffer | 414/544 |
| 3,610,453 | 10/1971 | Goodacre | 414/631 |
| 3,820,633 | 6/1974 | Thorp, Jr. | 187/95 |
| 3,841,442 | 0/1974 | Erickson et al. | 187/9 R |
| 3,861,535 | 1/1975 | Huxley, III et al. | 414/795.3 |
| 4,261,438 | 4/1981 | Olson | 187/9 E |
| 4,312,427 | 1/1982 | Stedman | 187/9 E |
| 4,356,893 | 11/1982 | Johannson | 187/9 E |
| 4,369,861 | 1/1983 | Rietman | 187/9 E |
| 4,531,615 | 7/1985 | Wible | 187/9 E |
| 4,619,465 | 10/1986 | Johnson | 384/626 |
| 4,621,711 | 11/1986 | Miyashige et al. | 187/9 E |
| 4,640,662 | 2/1987 | Spellman | 414/642 |
| 4,910,846 | 3/1990 | Andreasson et al. | 384/626 |

*Primary Examiner*—P. W. Echols
*Assistant Examiner*—David P. Bryant
*Attorney, Agent, or Firm*—Sidney W. Millard

[57] ABSTRACT

This invention incorporates a unique process for alignment of a reciprocable frame between the shafts of the mast of a fork lift. By using a shim having a thickness of about one-eighth inch between the inside surfaces of the shafts and the edges of the frame, guide rollers on the outside of the shafts can be adjusted to hold the frame in alignment. Guide roller adjustment is accomplished by mounting the rollers on eccentrics which are adjusted after the shim is in place. After adjustment the rollers are locked in place. Then after the shim is removed the rollers inherently align the frame between the vertical shafts.

4 Claims, 7 Drawing Sheets

PROCESS FOR ALIGNING A RECIPROCABLE FRAME BETWEEN PARALLEL VERTICALLY EXTENDING SHIFTS OF A MAST OF A FORK LIFT

This is a division of application Ser. No. 312,058, filed Feb. 21, 1989.

FIELD OF THE INVENTION

This invention relates to fork lifts.

BACKGROUND OF THE INVENTION

There are many prior art material handling vehicles of the fork lift type which have been designed for various specific needs or uses. Of these prior art types, the more conventional and most widely used require a counterweight disposed near the rear position to provide stability during the lifting and carrying of a load. Some fork lifts provide adjustable counterbalance weights, adjustable according to the weight on the prongs of the fork. While these types of vehicles provide a greater flexibility for various given applications, they also represent a very expensive investment. In certain agricultural applications which require movement over fields and the like, the great weight of the vehicle is also a disadvantage since it tends to create problems when soil conditions are soft. Thus, there is a need for a light weight vehicle and specifically one without counterweights.

One type of vehicle that has attempted to overcome the need for counterweights does so by disposing the fork prongs between a pair of rails or frame members to establish the center of gravity between the rear and front wheels. However, while this configuration reduces the cost and weight, in some instances, it also hinders the usefulness of the vehicle in certain specialized applications. This type of fork lift vehicle is limited in applications wherein the load or pallet fits between the confines of the frame and wherein the pallet is loaded or unloaded only at ground level.

These prior types of vehicles are represented by the U.S. Pat. Nos. 3,861,535; 3,039,637; 3,321,109 and 3,610,453.

Prior to the present invention, there has not been a fork lift vehicle which did not require the conventional counterweights used to stabilize the load and which also permitted the flexibility of loading or unloading at both ground level as well as at an elevated position.

A U.S. Pat. No. 2,667,885 discloses the concept of picking up heavy loads from the ground level and transporting them while the center of gravity of the load is intermediate to the front and rear wheels.

Stabilizing feet affixed to the forward end of a fork lift truck are not new and examples are in U.S. Pat. Nos. 3,235,105 and 3,586,183. The purpose of retractable stabilizing feet on the forward end of a fork lift truck is to provide stability when the lifting is taking place as an alternative to counterweights on the back of fork lift trucks.

This invention uses a chain-link drive mechanism in combination with sprocket wheels to give a positive power drive to the movement of the forks for lifting and lowering loads as needed. Chains are substituted for rigid piston and cylinder combinations because the chains allow more play and flexibility in the mast of a fork lift truck. Chains are not new per se and examples of chain use in fork lift trucks is shown in U.S. Pat. Nos. 4,369,861; 4,621,711; 4,531,615; and 4,312,427.

One of the reasons for the unique structure of this invention is to provide a clear line of sight between the operator and the forward position of the fork lift. Other conventional devices for the most part obstruct the vision of the driver by providing a central bar between the two upstanding shafts forming the mast and/or the driving piston will rise and fall in the area between the shafts. This is a safety hazard in industrial environments. The structure of the instant invention will not have these problems, however, it is acknowledged that merely providing a clear line of sight between the shafts of the mast of the fork lift is not new, see for example U.S. Pat. Nos. 4,356,893 and 4,261,438.

SUMMARY OF THE INVENTION

The fork lift vehicle of this invention involves a generally U-shaped frame with front drive wheels and a caster on the back. The driver's seat is mounted near the caster portion of the frame and the controls for driving and lifting the carriage of the fork lift are located within easy reach of the driver's seat. The mast of the fork lift reciprocates forwardly and backwardly by piston and cylinder combinations which move the mast along the parallel legs of the U-shaped frame.

Another pair of piston and cylinder combinations are mounted to the vertically extending mast for purposes of tilting the mast forwardly and backwardly through an angle of about 14°. Nominally the backward tilt should be up to about 6° and the forward tilt should be up to about 8. The purpose is to get the prongs in proper position for inserting into openings in a pallet. The mast is tilted forward to allow the prongs of the fork to be oriented to slide into the receiving pockets of the pallet or whatever pocket the forks are designed to fit into. The mast may be tilted back for purposes of having whatever is supported by the forks to be inclined backward so as not to accidentally slide or roll off the forks when the truck stops with a load in elevated position.

A fork lift truck involving positive chain-drives for driving the forks upward or downward has the beneficial effect of allowing the forks to be inserted in pockets on the rear of a tractor trailer and the power of the hydraulic piston in combination with a positive chain-drive allow the fork lift to lift itself to a suitable level and be transported by the tractor trailer to a job site without the fork lift having to be loaded onto the bed of the trailer and taking up valuable space.

The mast per se comprises two vertically extending parallel shafts. A reciprocating frame is mounted between them to be driven up and down by a piston and cylinder combination located therebetween. A carriage is mounted on the reciprocating frame and includes the fork or forks projecting forwardly.

This invention incorporates a unique process for alignment of the reciprocable frame between the shafts. By using a shim having a thickness of about one-eighth inch between the inside surfaces of the shafts and the edges of the frame, guide rollers on the outside of the shafts can be adjusted to hold the frame in alignment. Guide roller adjustment is accomplished by mounting the rollers on eccentrics which are adjusted after the shim is in place. After adjustment the rollers are locked in place. Then after the shim is removed the rollers inherently align the frame between the vertical shafts.

The frame which is a part of the fork lift carriage rides between the two shafts while the forks and their supporting structure ride on the forward end of the mast. The means for mechanically connecting the carriage to the reciprocable frame have been a problem in the past, in that, welding or bolting tends to weaken the connection at a stress concentration point, namely, the curve of the corners of the box channel forming the outer extremes of the frame. This invention has recognized the problem and achieved a solution. It is to provide the connection between the front carriage and the rectangular box frame element with a C-shaped welding bracket which fits over the box element and is welded thereto. The C-shaped element extends at least half the distance across the box-shaped frame edge, thereby, the stress concentration point is moved from the corner area of the box shape element to a place more remote. Thus there is a much less chance of cracking at the stress concentration point and the overall frame is strengthened.

Objects of the invention not clear from the above will be understood more clearly from a review of the drawings and the description of the preferred embodiments which follow.

DESCRIPTION OF THE PREFERRED EMBODIMENT

Figure 1:
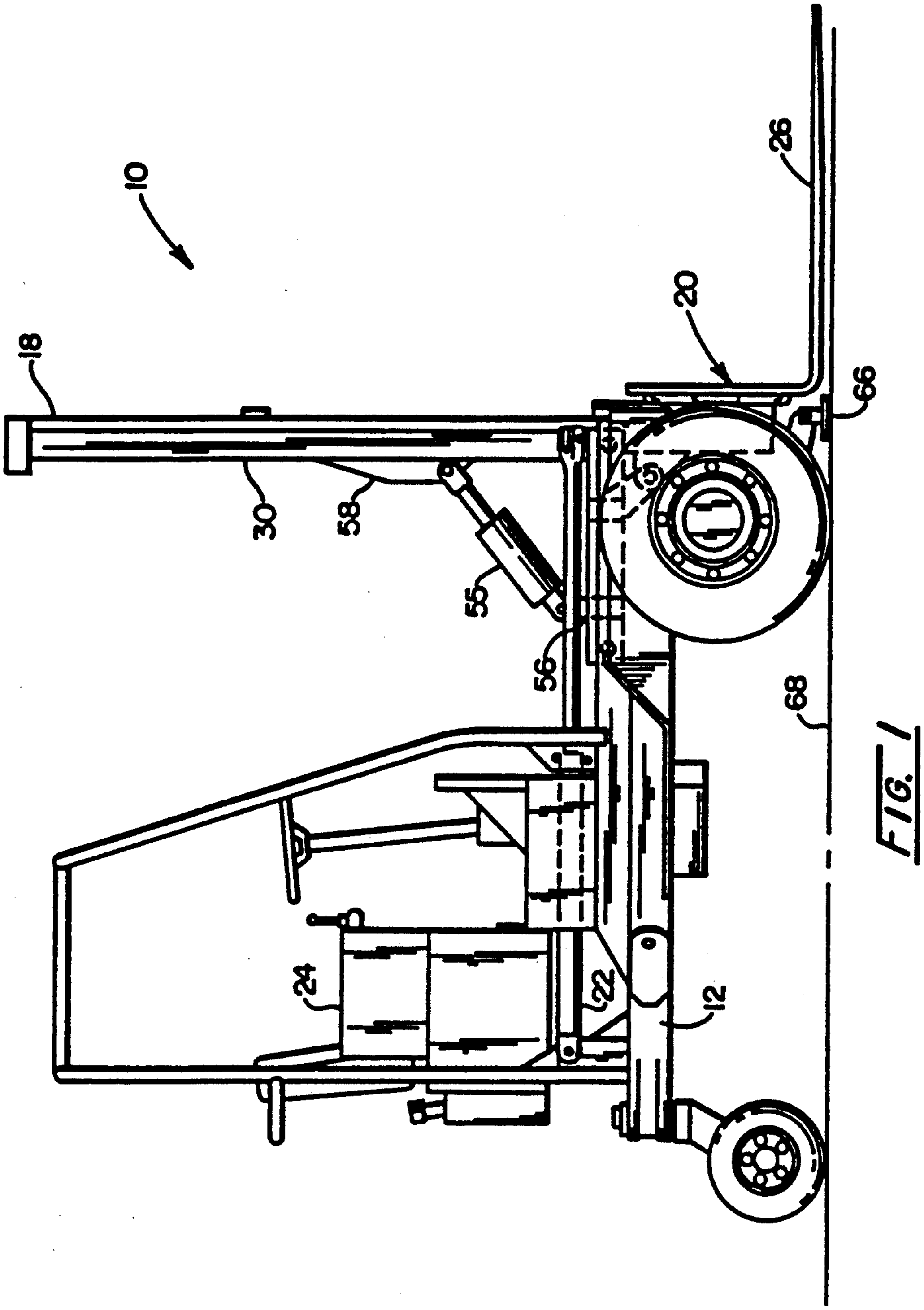
FIG. 1 is a side elevational view of the fork lift of this invention with the forks down and the mast tilted forward.
Figure 2:
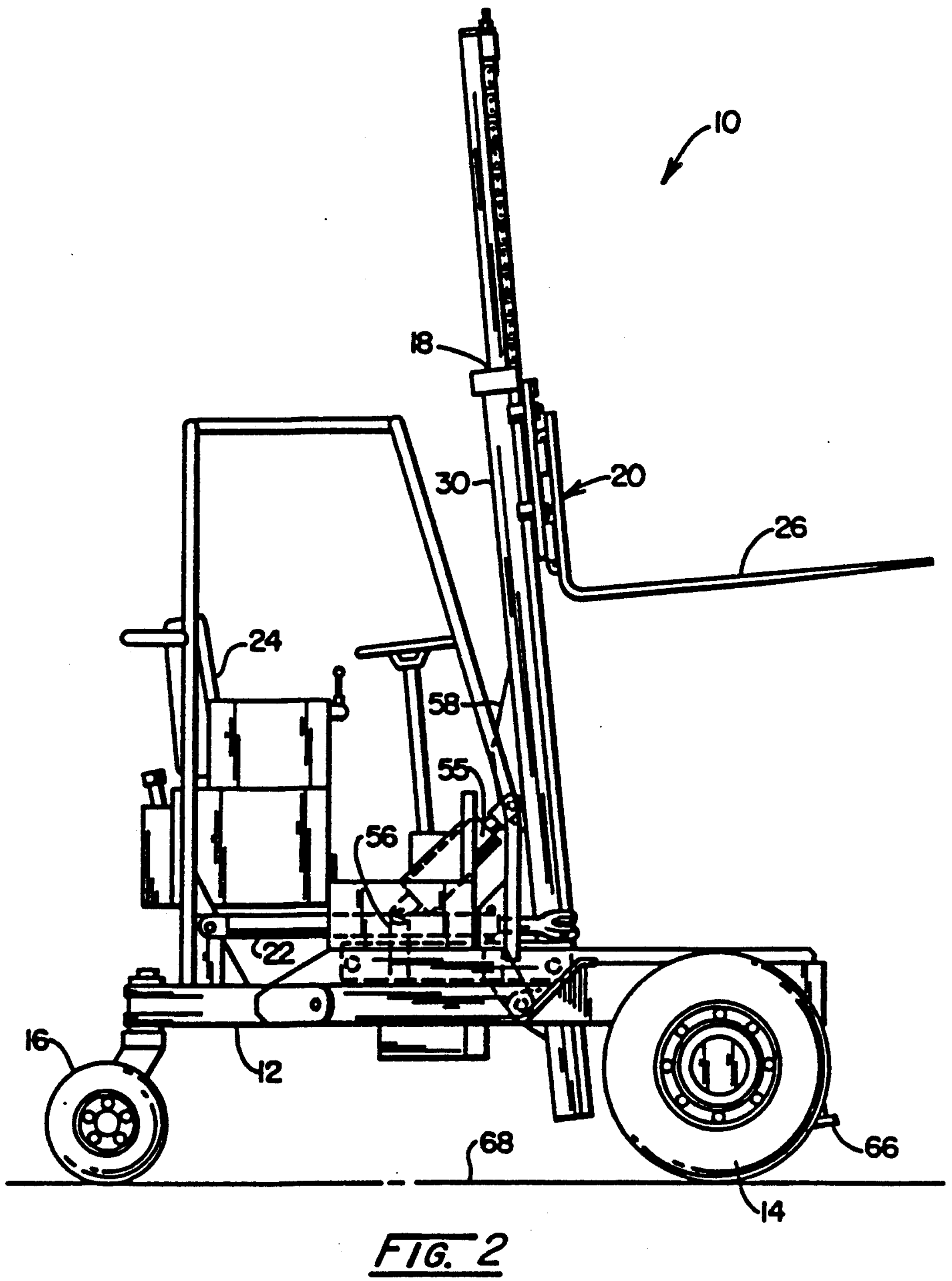
FIG. 2 is a side elevational view of the fork lift of FIG. 1 with the mast tilted rearwardly, the carriage and frame withdrawn toward the rear of the fork lift and with the forks raised.
Figure 3:
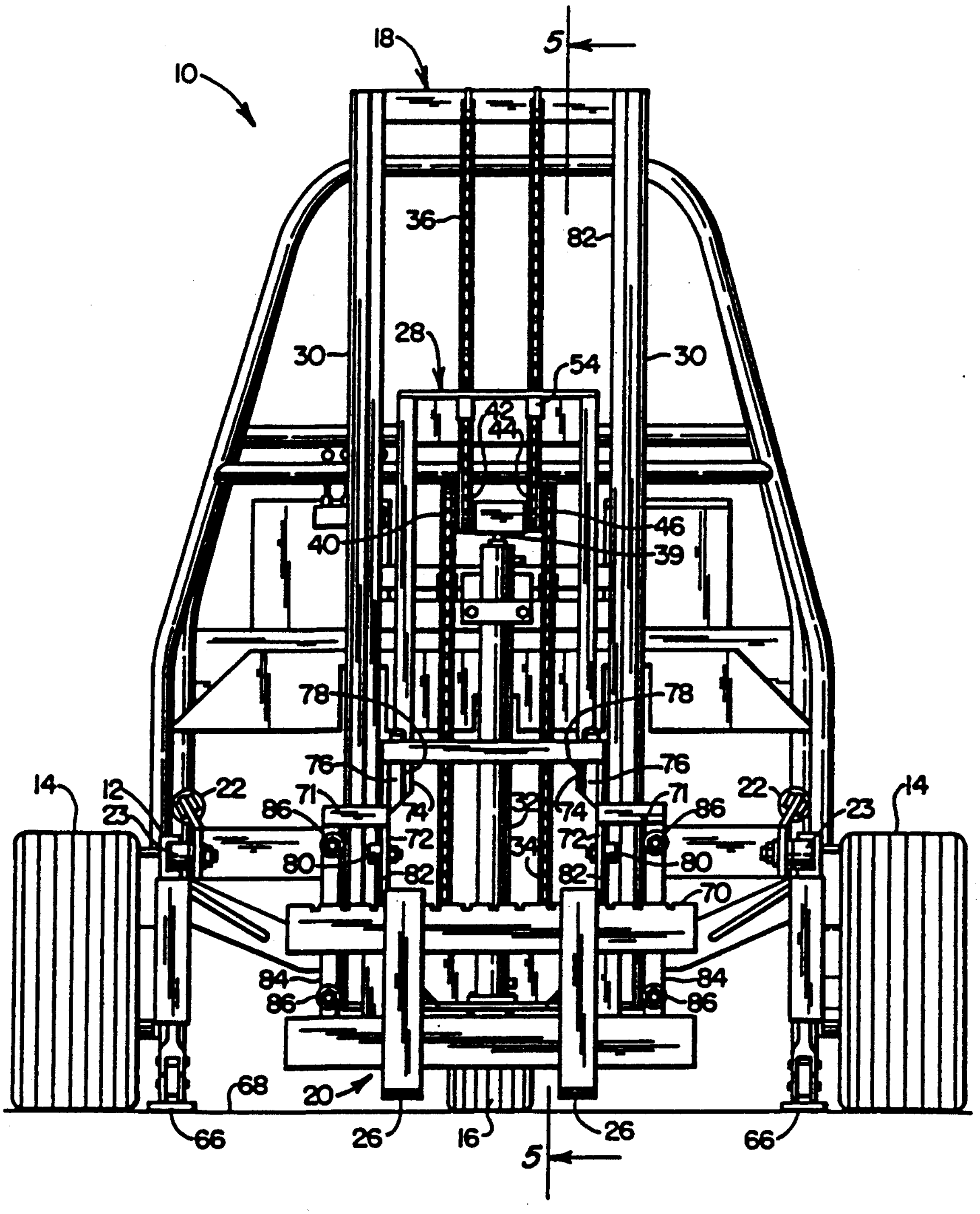
FIG. 3 is a front elevational view of the fork lift of FIG. 1.
Figure 4:
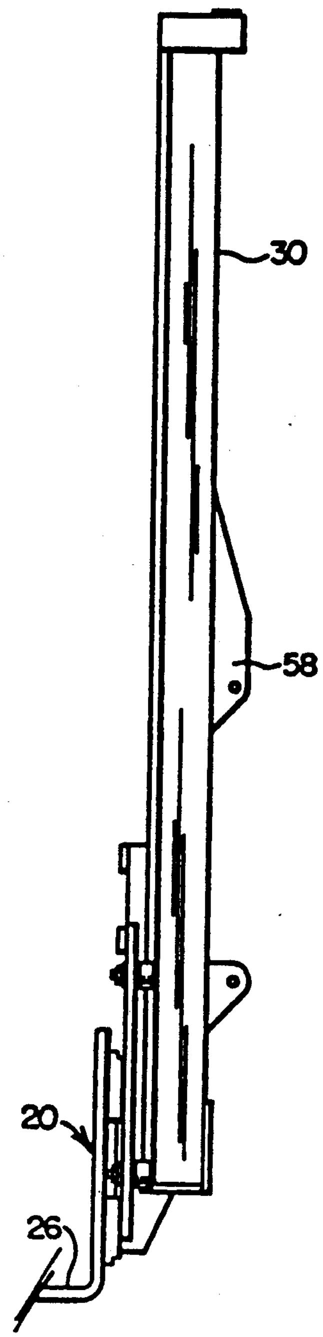
FIG. 4 is a fragmentary side elevational view of the mast and carriage combination.

Looking to FIGS. 1-3, a fork lift truck 10 is illustrated in operable position. FIGS. 1 and 3 show the fork in its forward lowered position to pick up a load and FIG. 2 shows the fork retracted to carrying position and raised to a suitable height. The fork lift vehicle includes a generally U-shaped frame 12 having a pair of hydraulically driven wheels 14 on the front and a caster wheel 16 on the back. The two legs of the U-shaped frame extending forwardly are aligned parallel to each other to support the mast 18 and carriage 20 as it is reciprocated forwardly and backwardly by piston and cylinder combination 22. FIG. 3 shows the carriage and mast supported by rollers 23 in the channel shaped frame 12.

A seat 24 is mounted on the frame nearest the caster wheel 16 and the various steering and elevational control components are mounted in proximity to the seat.

The lift assembly 20 includes one or a plurality of forwardly extending fork prongs 26. The lift assembly or carriage includes the prongs 26 as well as the structural elements connecting it to a frame 28 which is mounted between two upstanding shafts 30. Shafts 30 comprise a part of the mast 18 and are aligned in parallel fashion to support reciprocation of the frame 18, prongs 26 and the associated connecting apparatus in response to the piston and cylinder combination 32 mounted intermediate the two shafts 30. The frame 28 is reciprocated by the piston-cylinder combination 32 and the associated pair of chains 34 and 36 as will be explained subsequently.

Figure 5:
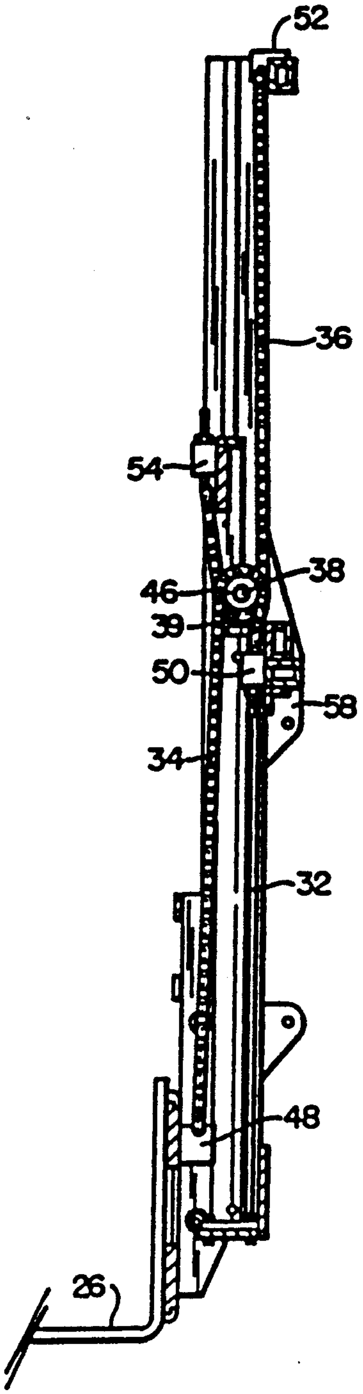
FIG. 5 is a fragmentary side elevational view of the mast and carriage combination, partially in section, taken along 5—5 of FIG. 3.
Figure 6:
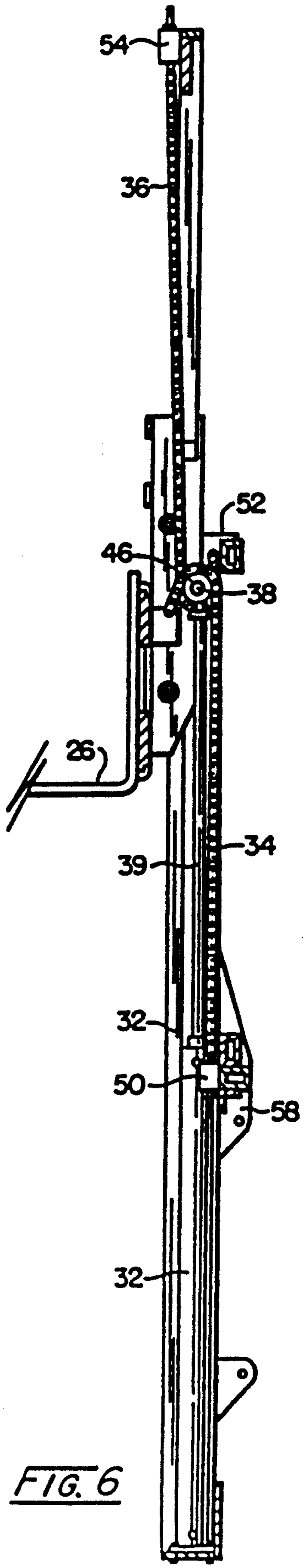
FIG. 6 is a fragmentary side elevational view of the mast and carriage combination, partially in section, similar to FIG. 6 but with the carriage raised.

The piston-cylinder combination 32 is designed to reciprocate and move an axle 38 upwardly and downwardly in response to the hydraulic pressure. The axle 38, best seen in FIGS. 5 and 6, is mounted on the upper end of the piston rod 39 which projects upwardly from the cylinder. Mounted on the axle are at least four sprockets 40, 42, 44 and 46.

Note that the axle 38 mounts all of the sprockets on bearings, that is, the sprockets rotate about the axle 38 in response to the links of chains 34, 36. Raising of the axle 38 will rotate all of the sprockets independently and simultaneously and the sprocket prongs will engage the links of the chains 34 and 36 to positively move the frame 28 according to the control of the fork lift operator.

The two lower chains 34 are attached mechanically to a block 48 attached to the supporting crossbeams of the carriage and the chains extend upwardly and over sprockets 40 and 46, then they extend downwardly where they are fixed to a lower horizontal crossbar 50 which is immovably connected to the vertical shafts 30. Thereby, when the piston and cylinder combination 32 drives axle 38 upward it will cause the sprocket wheels 40 and 46 to rotate and pull the frame 28 and prongs 26 upward, see FIG. 6.

At the same time the sprockets 42 and 44 are also being rotated because they are also connected to the axle. Chains 36 are attached to another upper horizontal crossbar 52, see FIGS. 5 and 6, from there they extend downwardly beneath sprockets 42 and 44 and then upwardly to be connected with a crossbeam 54 which is a rigid, fixed part of frame 28. Rotation of sprockets 42 and 44 pulls the frame 28 upward by the tension created in chain 36 between upper crossbar 52 and the axial 38. The hydraulic controls which are not illustrated do not allow movement of the frame and carriage except by direct drive. If the hydraulic motor is inoperable the carriage remains stationary, it will not descend by gravity.

Looking to FIGS. 1 and 3, a pair of piston-cylinder combinations 55 are mounted on the carriage at 56 and to a pair of ears 58 secured to the back side of vertical shafts 30. The purpose is to tilt the mast 18 as will be explained in more detail subsequently. The piston-cylinder combination 55 is designed to tilt the mast up to about 6° backward toward the driver and up to about 8° forward away from the driver for a total of amount 14° of angular rotation measured from vertical plane bisecting U-shaped frame 12 and the mast 18.

Figure 13:
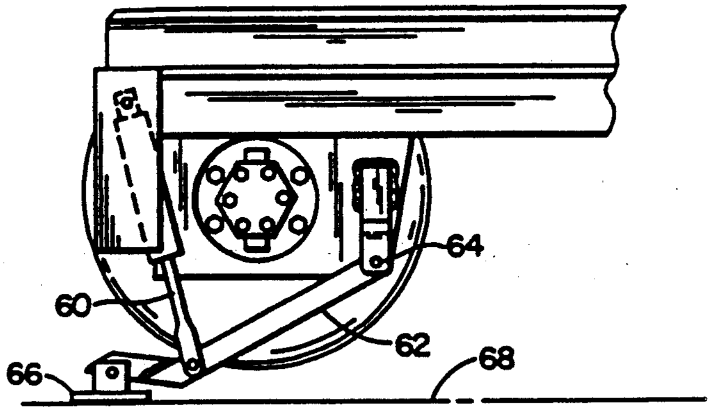
FIG. 13 is a fragmentary side elevational view of the front wheel of the fork lift truck showing the stabilizing feet mounted in lift position.

A pair of stabilizing feet are illustrated in FIGS. 1 and 3 in operative position and in FIG. 2 in inoperative position. The elements are best seen in FIG. 13. A hydraulically-driven piston and cylinder combination 60 is designed to reciprocate a lever arm 62 to pivot about pivot point 64 and cause stabilizing foot 66 to engage substrate 68 for reasons which will be explained subsequently. Note that foot 66 is mounted to pivot with respect to lever arm 62 to have a flat engagement with whatever substrate is encountered.

Figure 7:
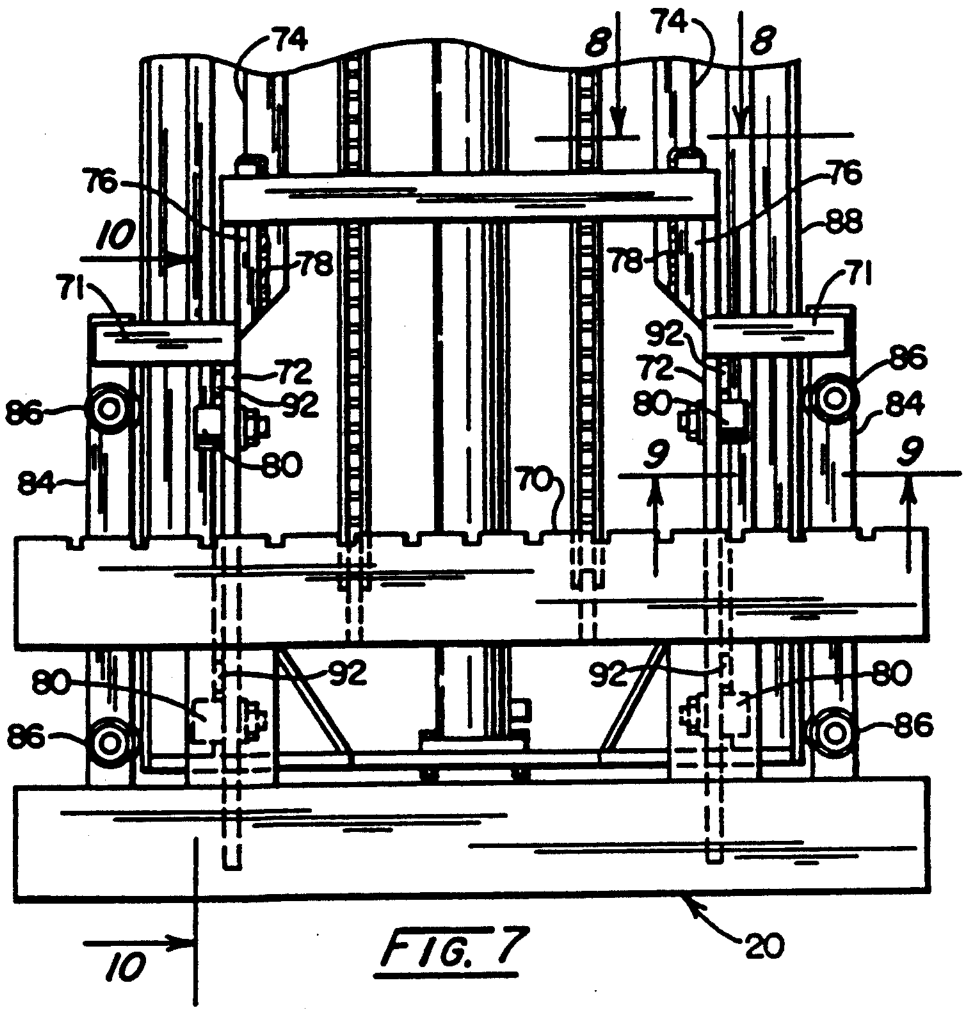
FIG. 7 is an enlarged fragmentary front elevational view of the carriage and mast in combination.
Figure 8:
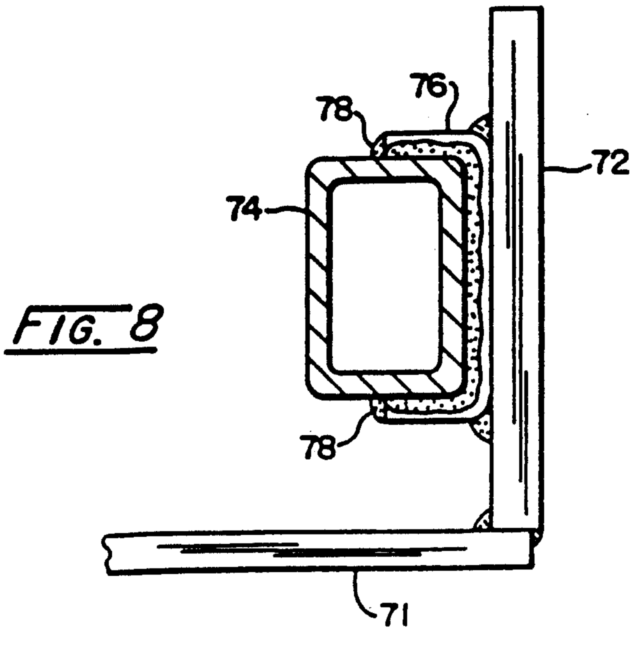
FIG. 8 is a sectional view taken along line 8—8 of FIG. 7.

Looking now to FIGS. 3, 7 and 8, the unique mounting structure between the carriage 20 and the reciprocating frame 28 will be described. It is critical that the carriage 20 mounting the prongs 26 be rigidly and permanently affixed to the reciprocating frame 28 for obvious reasons. Because of their locations the mechanical connections between the two receive the most stress during normal operations. Some prior apparatus uses a weld between a frame element and a plate extending from the carriage. These two abutting surfaces are welded at a flat area of a rectangular-shaped hollow structural element of the reciprocating frame. As is well known to mechanical engineers, mechanical stress points are greatest at corners. The conventional weld connection is made at the greatest stress point. As a consequence, it is at the weld, at the corner of the rectangular structural element, that failures most often occur during operation. As a result of experiments and various designs, this most frequent point of failure can be redesigned and the frequency of failure can be greatly reduced. This can be achieved by removing the weld connection from the stress concentration point. Looking specifically to the FIG. 8, a front plate 70 is welded to the carriage 20 and a transversely extending plate 72 is welded thereto. The plate 72 is to be attached to a structural side element 74 of the frame 28 and this is accomplished by providing a generally C-shaped connecting element or welding bracket 76 to fit partially around the rectangular structural element 74. Note that the C-shaped element 76 extends at least half way across the transverse dimension of structural element 74 and that the vertical weld 78 is remote from any corner in the structural element 74. Thereby, the stress concentration point is remote from the weld area.

Figure 9:
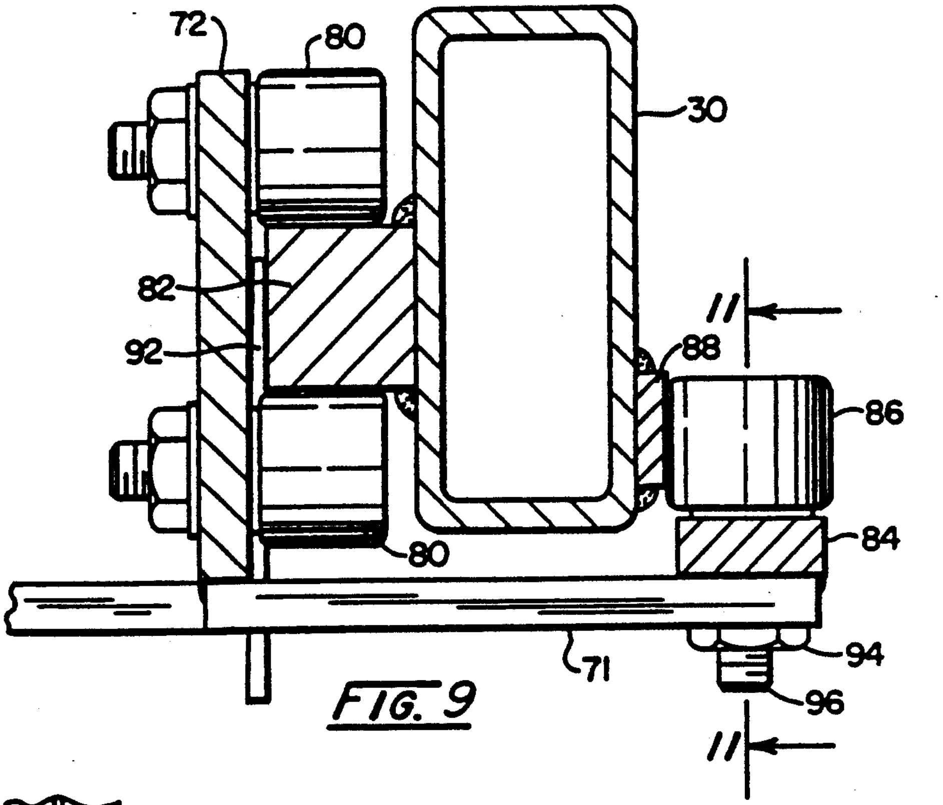
FIG. 9 is a sectional view taken along line 9—9 of FIG. 7.
Figure 10:
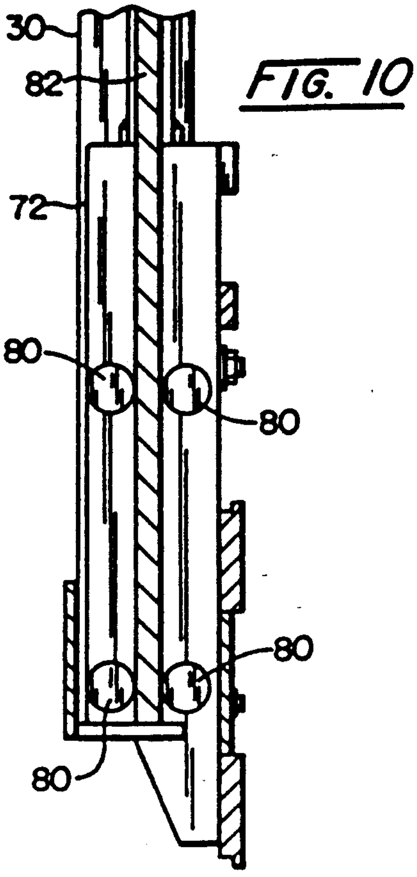
FIG. 10 is a sectional view taken along line 10—10 of FIG. 7.

Plate 72, on each side of the carriage supports two pairs of guide rollers 80, see FIGS. 9 and 10. Each pair of guide rollers is designed to straddle a solid guide member 82 which is welded to one of the shafts 30. Guide member 82 is made solid because it takes a substantial thrust from the rollers 80 during normal operations and it receives the most wear. As a consequence, the new design as embodied herein provides that the guide member 82 be of solid steel as opposed to the current practice of making member 82 of a hollow channel. This gives greater life to the structure of the mast. The rollers 80 and the guide member 82 serve to prevent the carriage from swinging forwardly and backwardly in the mast during operations.

Figure 11:
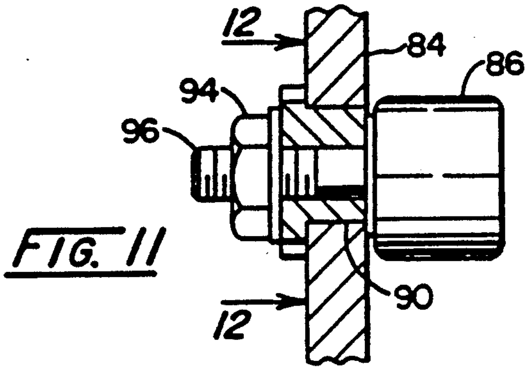
FIG. 11 is a sectional view taken along line 11—11 of FIG. 9.
Figure 12:
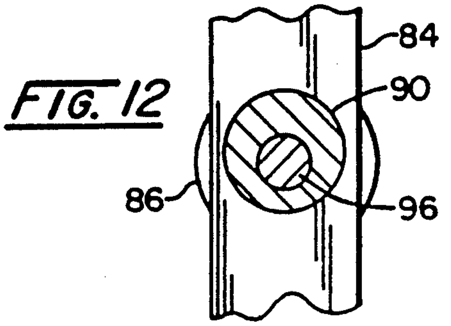
FIG. 12 is a sectional view taken along line 12—12 of FIG. 11.

Looking now to FIGS. 9, 11 and 12, it will be observed that plate 71 is welded to plate 72 and supports a vertically extending shaft or support bar 84 which in turn supports spaced rollers 86. Rollers 86 ride on wear plates 88 to guide the carriage on mast 18 and prevent its transverse swinging.

In the initial mounting of the frame 28 between the vertical shafts 30 it is important to align the plate 72 such that it does not rub against the surface of guide 82 on either side. This is accomplished through the cooperative use of the plate 71 and the roller 86 which is mounted in an eccentric 90 journaled in an aperture through shaft 84, see particularly FIGS. 11 and 12. In the mounting or aligning operation the first step is to slide a shim 92 between the surfaces of plate 72 and guide member 82. The shim has a thickness of about one-eighth inch. Then nut 94 is loosened to allow the eccentric 90 to be rotated to a point where the roller 86 engages wear plate 88 at a suitable pressure. Next the nut 94 is tightened on stud 96 to hold the roller 86 in place. As will be clear, the rollers 86 on the left-hand side as viewed in FIG. 3 will hold the plate 72 on the right-hand side away from guide bar 82. Similarly, the rollers 86 on the right-hand side as seen in FIG. 3 will hold the left-hand side of frame 28 away from guide bar 82.

Figure 14:
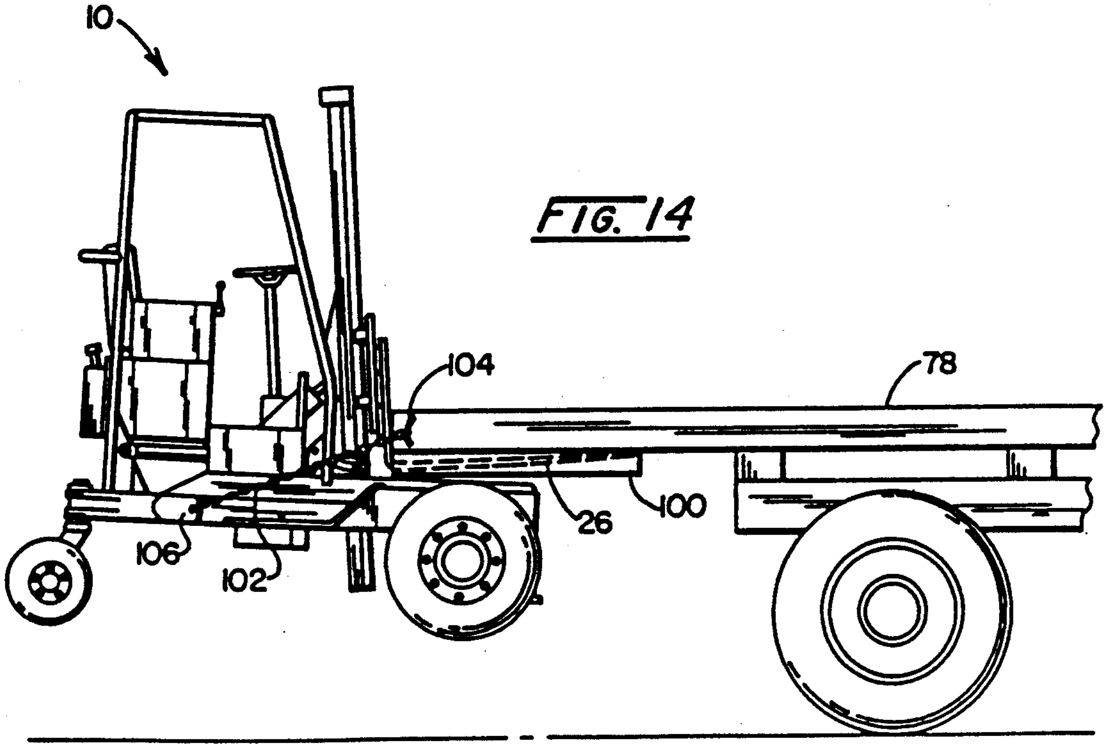
FIG. 14 is a side elevational view showing the fork lift truck of this invention mounted on the rear of a trailer.

Looking now to FIG. 14, the fork lift 10 is shown mounted on the back of a trailer 98 for purposes of transporting the fork lift to another job site. Note that the prongs 26 fit within a pair of pockets 100 rigidly connected to the bed of trailer 98 and as explained previously the fork lift has lifted itself by the chain drives such that the wheels of the fork lift do not engage the ground. After the fork lift is lifted into position, it is secured to the trailer by a chain 102 which hooks to an attachment 104 on the trailer and a corresponding attachment 106 on the fork lift.

When the operator arrives at the job site, the fork lift is disengaged from the truck in a conventional manner and driven to a location where the fork lift is to perform. The carriage 20 will be lowered to its lower most position and piston-cylinder combination 55 will be activated to tilt the mast 18 forward to the extent desired while the carriage is advanced to it forward most position as illustrated in FIG. 1.

Before any lifting is done the hydraulic system will be actuated to push the lever 62 downward such that foot 66 engages substrate 68, best seen in FIG. 13. As a result, the foot 66 becomes the pivot point for the fork lift. This insures that the weight of the operator and the operating equipment, indeed almost the total weight of the fork lift, is on one side of the pivot point 66 and thereby counter balances the weight of whatever will be picked up by the fork lift. After the fork lift raises the pallet above the ground it will be retracted to the position generally illustrated in FIG. 2 and tilted backwards such that the forks 26 extend upwardly to prevent the accidental dislodgment of the pallet upon a sudden stop of the fork lift. Whether or not the mast is tilted backward at the time the weight is lifted by the forks or after the weight is lifted and the carriage retracted to the retracted position of FIG. 2 is up to the operator of the fork lift depending on the circumstances at the time. After the fork lift is in position to transport the load to another site the stabilizing feet 66 will be raised out of contact with substrate 68. Thereafter, when the fork lift is to be unloaded the stabilizing feet 66 may re-engage the substrate before the carriage is shifted to the forward position illustrated in FIG. 1, as desired by the fork lift operator.

Having thus described the invention in its preferred embodiment it will be clear that modifications may be made to the structure without departing from the spirit of the invention. It is not the intention of the inventor to be limited by the words used to describe the invention in the specification nor the structure shown in the drawings. Rather it is intended that the invention be limited only by the scope of the appended claims.

We claim:

1. A process for aligning a reciprocable frame between parallel, vertically extending shafts of a mast of a fork lift truck to prevent forward, backward and sideward sway of a load carried by said truck, each shaft having support bar attached thereto, the frame being attached to a carriage projecting forwardly of said mast, the carriage including a pair of parallel plates mechanically connected thereto, said plates projecting rearwardly from said carriage to a location between said shafts, said support bars extending parallel with said shafts and located between said plates and said shafts, each plate supporting two pairs of vertically spaced apart rollers, each pair of rollers straddling its adjacent support bar to prevent forward and rearward sway of the carriage; two additional rollers mounted on each side of said carriage, said additional rollers being (1) vertically spaced, (2) having axes of rotation perpendicular tot the axes of rotation of said rollers straddling said support bar and (3) mounted to roll on the outermost surface of said vertically extending shafts to prevent side sway of said carriage, each said additional roller being mounted on said carriage on an eccentric, the process comprising, p1 mounting the carriage in generally operative position with the plates adjacent and between the vertically extending shafts and support bars, mounting each pair of rollers supported on said plates to straddle the adjacent support bar, inserting a shim between one of said plates and one of said support bars at the elevation of an adjacent said additional roller, rotating the eccentric until said adjacent additional roller is suitably tight against the shaft with its axis of rotation perpendicular to the axis of rotation of said pairs of rollers, removing the shim, and repeating the process with each said additional roller.

2. The process of claim 1 including the steps of providing a pair of wear plates, one between said shaft and its adjacent additional rollers.

3. The process of claim 2 including the step of inserting said shim to provide a spacing of about ⅛ inches between the surfaces of each said plate and the adjacent said support bar.

4. The process of claim 1 including the step of inserting said shim to provide a spacing of about ⅛ inches between the surfaces of each said plate and the adjacent said support bar.

* * * * *